United States Patent
Wenzeis et al.

(10) Patent No.: US 12,269,747 B2
(45) Date of Patent: Apr. 8, 2025

(54) METHOD FOR PRODUCING POLYCRYSTALLINE SILICON

(71) Applicant: Wacker Chemie AG, Munich (DE)

(72) Inventors: Markus Wenzeis, Wurmannsquick (DE); Piotr Filar, Marktl (DE); Thomas Schröck, Kastl (DE)

(73) Assignee: Wacker Chemie AG, Munich (DE)

( * ) Notice: Subject to any disclaimer, the term of this patent is extended or adjusted under 35 U.S.C. 154(b) by 538 days.

(21) Appl. No.: 17/617,704

(22) PCT Filed: Jun. 11, 2019

(86) PCT No.: PCT/EP2019/065165
§ 371 (c)(1),
(2) Date: Dec. 9, 2021

(87) PCT Pub. No.: WO2020/249188
PCT Pub. Date: Dec. 17, 2020

(65) Prior Publication Data
US 2022/0234900 A1     Jul. 28, 2022

(51) Int. Cl.
| | |
|---|---|
| *C01B 33/035* | (2006.01) |
| *C01B 33/02* | (2006.01) |
| *C01B 33/021* | (2006.01) |
| *C01B 33/027* | (2006.01) |
| *C01B 33/03* | (2006.01) |

(52) U.S. Cl.
CPC ............ *C01B 33/035* (2013.01); *C01B 33/02* (2013.01); *C01B 33/021* (2013.01); *C01B 33/027* (2013.01); *C01B 33/03* (2013.01)

(58) Field of Classification Search
None
See application file for complete search history.

(56) References Cited

U.S. PATENT DOCUMENTS

| | | | | |
|---|---|---|---|---|
| 7,939,173 B2 * | 5/2011 | Sofin | ................... | C30B 13/00 |
| | | | | 423/349 |
| 2012/0322175 A1 | 12/2012 | Pazzaglia et al. | | |
| 2013/0017139 A1 * | 1/2013 | Rigon | ................... | C23C 16/24 |
| | | | | 422/187 |

FOREIGN PATENT DOCUMENTS

| | | |
|---|---|---|
| EP | 1992593 B1 | 10/2010 |
| EP | 2444373 B1 | 12/2012 |
| EP | 2077252 B1 | 2/2017 |
| EP | 2662335 B1 | 4/2017 |
| JP | 7301569 A2 | 11/1995 |
| JP | 2003128492 A | 5/2003 |
| JP | 2011084419 A | 4/2011 |
| KR | 20110134394 A | 12/2011 |
| WO | 2009047107 A2 | 4/2009 |
| WO | 2014173596 A1 | 10/2014 |
| WO | 2015014590 A1 | 2/2015 |
| WO | 2019110091 A1 | 6/2019 |

* cited by examiner

*Primary Examiner* — Michael Forrest

(57) ABSTRACT

A method for producing polycrystalline silicon includes introducing a reaction gas, which in addition to hydrogen contains silane and/or at least one halosilane, into a reaction space of a gas phase deposition reactor. The reaction space includes at least one heated filament rod upon which by deposition silicon is deposited to form a polycrystalline silicon rod. During the deposition, the the morphology of the silicon rod is determined.

10 Claims, 2 Drawing Sheets

METHOD FOR PRODUCING POLYCRYSTALLINE SILICON

CROSS-REFERENCE TO RELATED APPLICATION

This application is a U.S. National Phase Application of PCT/EP2019/065165, filed Jun. 11, 2019, the contents of which are hereby incorporated by reference in their entirety.

BACKGROUND

The invention relates to a method for producing polycrystalline silicon, wherein during the method the morphology of the silicon is determined on the basis of an index M and the method is controlled such that M assumes a value from 0 to 5.

Polycrystalline silicon (polysilicon) serves as a starting material in the production of single-crystal (monocrystalline) silicon, for example by means of crucible pulling (Czochralski or CZ process) or by means of zone melting (float zone process). Single-crystal silicon is used in the semiconductor industry for the manufacture of electronic components (chips).

Polysilicon is also needed for the production of multicrystalline silicon, for example by means of block casting processes. The multicrystalline silicon, obtained in the form of a block, can be used for the manufacture of solar cells.

Polysilicon is obtainable by the Siemens process—a chemical vapour deposition process. This involves heating support bodies (usually composed of polysilicon) in a bell-shaped reactor (Siemens reactor) by way of the direct passage of current and introducing a reaction gas comprising a silicon-containing component and hydrogen. The silicon-containing component is generally monosilane ($SiH_4$) or a halosilane of the general composition $SiH_nX_{4-n}$ (n=0, 1, 2, 3; X=Cl, Br, I). It is typically a chlorosilane or a chlorosilane mixture, usually trichlorosilane ($SiHCl_3$, TCS). Predominantly, $SiH_4$ or TCS is used in a mixture with hydrogen. The structure of a typical Siemens reactor is described by way of example in EP 2 077 252 A2 or EP 2 444 373 A1. The bottom of the reactor (bottom plate) is generally provided with electrodes that receive the support bodies. The support bodies are customarily filament rods (slim rods) made of silicon. Typically, two filament rods are connected via a bridge (made of silicon) to form a rod pair that forms a circuit via the electrodes. The surface temperature of the filament rods is typically more than 1000° C. during the deposition. At these temperatures, the silicon-containing component of the reaction gas decomposes and elemental silicon is deposited from the vapor phase as polysilicon. The diameter of the filament rods and of the bridge increases as a result. After reaching a predetermined diameter of the rods, the deposition is usually stopped and the polysilicon rods obtained are removed. After the removal of the bridge, approximately cylindrical silicon rods are obtained.

The morphology of the polysilicon, i.e. of the polysilicon rods and of the chunks produced therefrom, generally has a strong influence on performance during further processing. The morphology of a polysilicon rod is fundamentally determined by the parameters of the deposition process (e.g. rod temperature, silane and/or chlorosilane concentration, specific flow rate). Depending on the parameters, pronounced interfaces, up to and including holes and trenches, can form. These are generally not distributed homogeneously inside the rod. On the contrary polysilicon rods having different (usually concentric) morphological regions may be formed by varying the parameters as described for example in EP 2 662 335 A1. The dependence of morphology on rod temperature is expressed for example in US 2012/0322175 A1. This document describes a method for monitoring the surface temperature via a resistance measurement at at least one polysilicon rod during the deposition. However, the method does not permit any conclusions regarding the morphology of the silicon, on the contrary a uniform morphology is a prerequisite.

The morphology of polysilicon can range from compact and smooth to very porous and fissured. Compact polysilicon is substantially free from cracks, pores, joints and fissures. The apparent density of polysilicon of this type can be equated to the true density of silicon or at least corresponds to this to a good approximation. The true density of silicon is 2.329 $g/cm^3$.

A porous and fissured morphology has negative consequences in particular on the crystallization behavior of polysilicon. This is particularly apparent in the CZ process for producing single-crystal silicon. Here, the use of fissured and porous polysilicon leads to economically unacceptable yields. In the CZ process particularly compact polysilicon generally leads to markedly higher yields. However, the production of compact polysilicon is usually more costly since a slower deposition process is needed. In addition, not all applications require the use of particularly compact polysilicon. For example, the morphology requirements when producing multicrystalline silicon by the block casting process are much lower. In general, a crystallization process or a particular form of such a process achieves an economic optimum when the starting material used is polysilicon having a morphology which does not exceed a limit value.

Accordingly, polysilicon is distinguished and classified not only according to purity and chunk size but also according to its morphology. Since various parameters can be subsumed under the term "morphology", such as for example porosity (sum of closed and open porosity), specific surface area, roughness, gloss and color, reproducible determination of the morphology presents a great challenge. A visual assessment of the polysilicon rods or fragments after the deposition, as proposed inter alia in WO 2014/173596 A1, has the disadvantage that the morphology in the interior can potentially differ markedly from the morphology of the surface.

For example, for the determination of porosity, the volume of the test object can be determined by means of a differential method and then the effective density can be compared with the relative density. In the simplest case, the test object is immersed in a full water container, with the volume of the water that has overflowed corresponding to that of the test object. Applied to polysilicon, a suitable fluid has to be used in order to avoid oxidation and contamination and to wet the surface completely. Especially in the case of polysilicon rods produced by the Siemens process, which may have a length of between 2 and 4 m, this is associated with considerable effort. Options for density measurement in the case of polysilicon are described for example in WO 2009/047107 A2. A fundamental disadvantage of a subsequent inspection of the morphology is that it is too late to influence the deposition process and hence to control the morphology.

The invention has for its object to provide a method for determining the morphology of polysilicon during deposition in order to make the production and processing of the polysilicon more efficient.

BRIEF SUMMARY

Embodiments of a method for producing polycrystalline silicon are provided below. In an embodiment, the method for producing polycrystalline silicon comprises introducing a reaction gas, which in addition to hydrogen contains silane and/or at least one halosilane, into a reaction space of a gas phase deposition reactor. The reaction space comprises at least one heated filament rod upon which by deposition silicon is deposited to form a polycrystalline silicon rod. During the deposition, to determine the morphology of the silicon rod, at least one thermographic image of the surface of said rod comprising a measurement area $A_{max}$ is generated, by image processing a segmentation of the measurement area $A_{max}$ into a first and a second area fraction is performed, wherein the first area fraction $A_t$ corresponds to a relatively high temperature $T_t$ compared to local average temperature values and the second area fraction $A_p$ corresponds to a relatively low temperature $T_p$ compared to local average temperature values, and a morphology index M is determined according to $$M = (T_t - T_p) * \frac{(A_t + A_p)}{A_{max}} * \frac{A_t}{(A_t + A_p)}, \quad \text{(formula I)}.$$

Through variation of at least one parameter selected from the group comprising U, I, surface temperature $T_{OF}$, reaction gas composition and volume flow, the deposition is controlled such that M has a value of 0 to 4, wherein U is in a range from 50 to 500 V, I is in a range from 500 to 4500 A, $T_{OF}$ is in a range from 950° C. to 1200° C., the volume flow is in a range from 1500 to 9000 m³/h and the reaction gas before entry into the reactor contains hydrogen in a proportion of 50% to 90%.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which.

DETAILED DESCRIPTION

Figure 1:
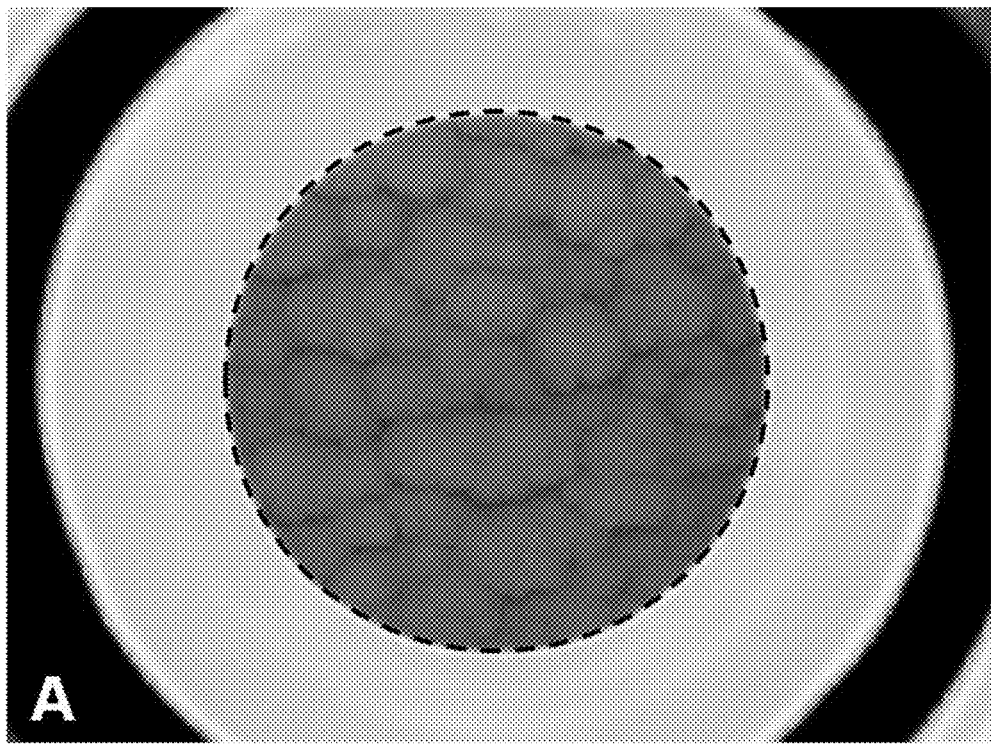
FIG. 1 includes images A, B, and C, where image A is thermographic image, images B and C show the result of segmentation of image A.
Figure 1:
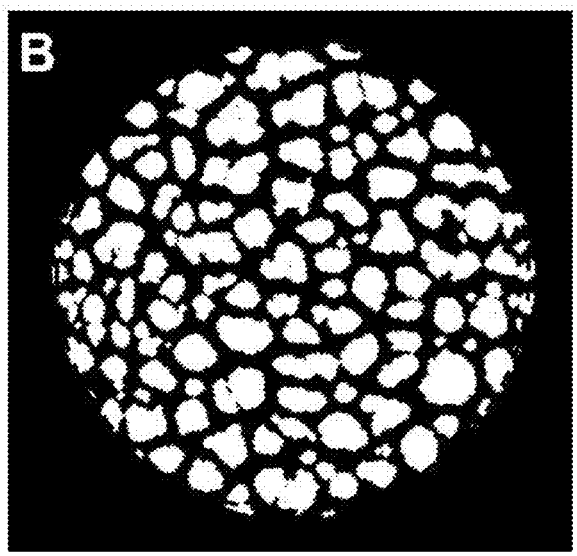
Figure 1:
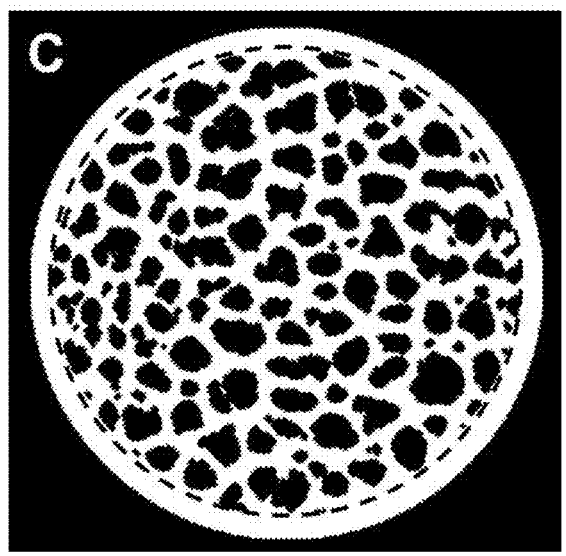

This object is achieved by a method for producing polycrystalline silicon comprising introducing a reaction gas, which in addition to hydrogen contains silane and/or at least one halosilane, into a reaction space of a gas phase deposition reactor, wherein the reaction space comprises at least one heated filament rod upon which by deposition silicon is deposited to form a polycrystalline silicon rod, wherein during the deposition, to determine the morphology of the silicon rod, at least one thermographic image of the surface of said rod comprising a measurement area $A_{max}$ is generated, by image processing a segmentation of the measurement area $A_{max}$ into a first and a second area fraction is performed, wherein the first area fraction $A_t$ corresponds to a relatively high temperature $T_t$ compared to local average temperature values and the second area fraction $A_p$ corresponds to a relatively low temperature $T_p$ compared to local average temperature values, and a morphology index M is determined according to $$M = (T_t - T_p) * \frac{(A_t + A_p)}{A_{max}} * \frac{A_t}{(A_t + A_p)}, \quad \text{(formula I)}.$$

The deposition is controlled such that M assumes a value from 0 to 5.

As already described at the outset, polysilicon with varying morphology can form depending on the deposition parameters, wherein regions of differing morphology which are separated from each other by interfaces can also occur within the same polysilicon rod, in particular in the radial direction of the cross-sectional area thereof. Morphology is to be understood here in particular to mean the degree of fissuring in the polysilicon resulting from the frequency and arrangement of holes, pores and trenches. Morphology can also be understood to mean the overall porosity of the polysilicon, which is made up of the sum total of all cavities connected to one another and to the surroundings and of the cavities not connected to each other. The overall porosity, i.e. the proportion of the overall pore volume (open and closed pores) in the overall volume of the polysilicon, may be determined in accordance with DIN-EN 1936.

During the deposition the formation of pores and trenches is apparent from a popcorn-like surface structure. In profile a popcorn surface is an accumulation of elevations (peaks) and trenches (valleys). The elevations and the trenches differ in terms of their temperature during the deposition. This is typically precisely the problem when determining a surface temperature $T_{OF}$ of the silicon rods since optimal measurement results are achievable only on an even surface. However, it has now been found that precisely the temperature differences between trenches and elevations on the silicon surface make it possible to draw conclusions about the morphology of the rods during the deposition.

In the method according to the invention the morphology is determined directly during the deposition by recording at least one thermographic image, wherein by image processing surface regions of elevated temperature (troughs) are separated from surface regions of reduced temperature. The morphology index M may then be calculated according to formula I.

A generally laborious and usually imprecise visual analysis of the polysilicon rods as a whole or in the form of chunks is not necessary after the deposition. Since the thermographic images are also in any case generated for determining the surface temperature $T_{OF}$ or at least may be generated with the same instrument, in particular a pyrometer, the apparatus requirements are very low. The determination of M may therefore be integrated into an existing system for process control without much effort. The use of the morphology index M for process control offers substantial potential for quality assurance and maximization of productivity. In particular, permanent monitoring of the morphology and process control according to the morphology make it possible to produce polysilicon precisely according to customer requirements.

M is a dimensionless index whose value increases the more fissured/porous a polysilicon rod. For example polysilicon rods for which M is greater than 3 have a considerable portion of popcorn. When M has a value of 0, rods having a very smooth surface, i.e. very compactly deposited polysilicon, are concerned.

It is particularly preferable when M has a value of 0 to 4, in particular of 0.1 to 3, especially preferably of 0.1 to 2.

For production of for example type A polysilicon the deposition is preferably controlled such that M has a value of 0 to 0.1. Type A is generally very compact and intended for the production of semiconductors, especially for the CZ process with the aim of maximizing a dislocation-free yield.

For production of for example type B polysilicon the deposition is preferably controlled such that M has a value of 0.1 to 1. Type B generally has an intermediate compactness and is used in particular for cost-optimized, robust semiconductor applications and demanding solar applications using monocrystalline silicon (CZ process).

For production of for example type C polysilicon, which is required in particular for robust solar applications using monocrystalline silicon, the deposition is preferably controlled such that M has a value from 1 to 3. Type C is less compact than type B, is cheaper and is particularly suitable for recharging processes in the CZ process.

For production of for example type D polysilicon the deposition is preferably controlled such that M has a value of 3 to 5. Type D has a high proportion of popcorn. It has a relatively fissured surface and a high porosity. It is used in particular for producing multicrystalline silicon for solar applications by means of directional solidification or block casting.

M is preferably kept substantially constant during the deposition. "Substantially" is in particular to be understood as meaning that temporary deviations of plus/minus 0.1 from a setpoint value for M may occur. The deviation may optionally also be plus/minus 0.2

Determination of the index M may be carried out continuously during the entire duration of the deposition or discontinuously at various points in time, preferably at equal time intervals, during the deposition. M is preferably determined continuously to ensure particularly precise control of the deposition.

The determination of M may further be carried out discretely in a time interval, wherein the time interval may in particular correspond to a specified growth in the diameter of the silicon rod. This provides information about the morphology of a region (concentric region) of the silicon rod which has grown in a particular time interval. Calculation of M in a certain time interval requires formation of the corresponding time integral of M.

It is preferable when at least two thermographic images of the same silicon rod, especially at different positions, are generated to determine M. Alternatively or in addition, one or more thermographic images may also be generated from respective different silicon rods. The morphology index M may then be formed as an average of the obtained individual values.

The generation of the thermographic image is preferably carried out with a thermographic camera (radiation pyrometer), especially from outside the reactor through an inspection window. It is also possible to generate a video, with individual images of the video then preferably being subjected to image processing. The image processing may in particular be carried out using software which is preferably integrated into the system of a process control station.

It is also possible to employ two or more thermographic cameras which may be positioned at different points around the reactor. The thermographic cameras are preferably positioned side-by-side (in the circumferential direction of the reactor) and each in front of an inspection window. They may also be positioned next to one another or one above the other in front of an inspection window. The cameras can be situated at different heights. Generation of the thermographic image is typically carried out on a silicon rod nearest to the inspection window. It is generally immaterial whether the thermographic image is generated for example at the height of the middle of the rod (middle between bridge and electrode) or at the height of the upper or lower third of the rod. The thermographic image is preferably generated from the rod middle.

Since $T_{OF}$ may also be determined with the thermographic camera, the determination of both values may be carried out on the same silicon rod/the same silicon rods. With regard to the determination of $T_{OF}$ reference may also be made to unpublished application PCT/EP2017/081551.

$T_{OF}$ is generally an important influencing variable which may typically be monitored and adapted by varying the current flow during the deposition. The heat flux leaving the silicon rods in principle increases with the deposition time since the diameter and hence the surface area of the rods increases. It is therefore typically necessary to adapt the current strength during the deposition.

Determination of diameter is preferably carried out from outside the reactor through an inspection window, in particular using a camera (for example digital/CCD camera). In terms of the positioning of the camera and the methodology for determining the diameter, reference may be made to the foregoing and to unpublished patent application PCT/EP2017/081551. Diameter determination may in principle also be carried out using one or more thermographic images.

The number of silicon rods/silicon rod pairs arranged in the gas phase deposition reactor is generally also immaterial to the implementation of the method according to the invention. The gas phase deposition reactor is preferably a Siemens reactor as described in the introduction and for example in EP 2 662 335 A1. Accordingly the filament rod is preferably two slim rods made of silicon connected via a bridge made of silicon to a rod pair, wherein the two free ends of the rod pair are connected with electrodes at the reactor floor. Typical examples of the number of silicon rods in a reactor are 36 (18 rod pairs), 48 (24 rod pairs), 54 (27 rod pairs), 72 (36 rod pairs) or 96 (48 rod pairs). To a good approximation the silicon rods may be described as cylindrical at all points in time during the deposition. This is especially independent of whether the slim rods are cylindrical or, for example, square.

The measurement area $A_{max}$ within which M is determined preferably has a size of 10 to 300 cm$^2$, preferably 30 to 200 cm$^2$, particularly preferably 50 to 150 cm$^2$. $A_{max}$ may in particular correspond to a section of the generated thermographic image. However, $A_{max}$ may also correspond to the entire thermographic image. The change in curvature with increasing diameter of the silicon rod may be neglected when specifying $A_{max}$.

The segmentation of the measurement area $A_{max}$ into a first area fraction $A_t$ and into a second area fraction $A_p$ is preferably carried out with a rank filter, in particular a median filter. This may be for example a 30*30 pixel median filter (the size of the environment of the pixel being considered is 30*30 pixels). Other median filters may also be employed.

Dividing the two images (original image divided by the smoothed image) affords the local deviation from the median. This is followed by a separation by less than 0 to obtain the area fractions of the popcorn (elevations). Smaller structures may optionally be deleted, and "holes" sealed, using standard image processing algorithms (for example with the commands from the National Instruments library: Dilate, Erode, Fill Holes, Separate Objects). The holes are generally artefacts from image processing. The mask is then used to separate elevations (popcorn) and trenches (valleys)

by filtering/separating the thermographic image (temperature array) generated by the measuring instrument. The temperatures $T_t$ and $T_p$ may then in each case be determined by median evaluation from the two thermograpic images (temperature arrays) obtained by separation.

The first area fraction $A_t$ corresponds to the area that is occupied by trenches (valleys) and has a temperature $T_t$. The second area fraction $A_p$ corresponds to the area that is occupied by elevations (peaks) and has a temperature $T_p$.

The temperature difference between trenches and elevations on the silicon surface may typically be 30° C. The surface temperature $T_{OF}$ during the deposition is typically in a range from 950° C. to 1200° C.

The deposition is preferably controlled by varying at least one parameter selected from the group comprising U, I, $T_{OF}$, reaction gas composition and volume flow.

I (rod current) is the current strength with which a filament rod/silicon rod is heated (Joule heating). U is the voltage which is applied across the ends of a silicon rod or filament rod for producing the rod current. U and I can be measured using commercially available measuring instruments. The volume flow is typically measured before entry of the reaction gas into the reactor, for example according to DIN EN 1343. U, I, $T_{OF}$ and the volume flow are normally always displayed and optionally plotted at a process control station. This is generally done by means of continuous or discontinuous feedback to the process control station, wherein the parameters are adapted according to the determined morphology index M in order thus to achieve the desired target value for M.

The voltage U (per rod pair) is preferably in a range from 50 to 500 V, particularly preferably from 55 to 250 V, especially from 60 to 100 V.

The current strength I (per rod pair) is preferably in a range from 500 to 4500 A, particularly preferably from 1500 to 4000 A, especially from 2500 to 3500 A.

Before entry into the reactor the reaction gas preferably contains hydrogen in a proportion of 50% to 90%, preferably of 60% to 80%. The composition of the reaction gas can be determined prior to supply to the reactor via Raman and infrared spectroscopy and also via gas chromatography.

The volume flow (measurable according to DIN EN 1343) of the reaction gas is preferably 1500 to 9000 m³/h, particularly preferably 3000 to 8000 m³/h.

A very wide variety of qualities of polysilicon (e.g. type A, B, C and D) is producible by controlling the deposition. Silicon rods having concentric regions of varying morphology may also be produced for example. The entire deposition process may particularly advantageously be adapted to the particular quality requirements to always select the most economical operation of the reactor.

Figure 2:
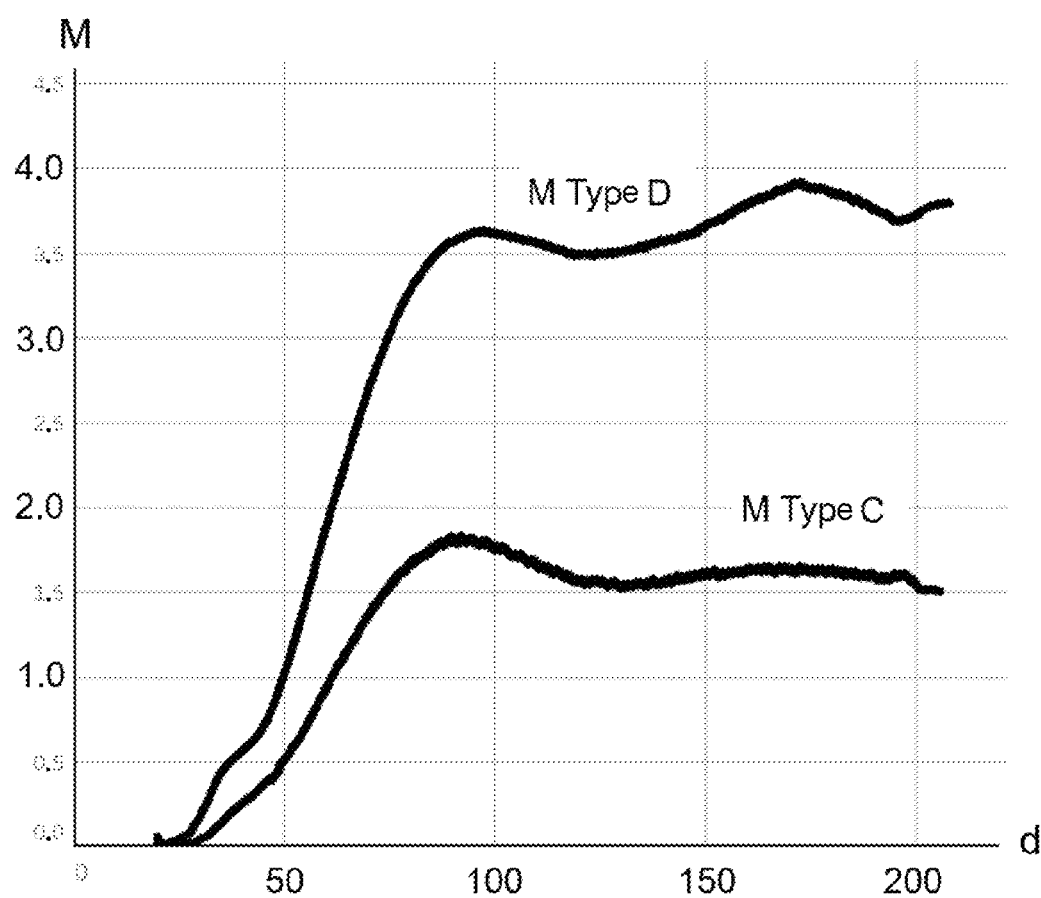
FIG. 2 is a graph illustrating the morphology index M as a function of diameter for two types of polysilicon.

FIG. 1 shows the segmentation of a thermographic image.
FIG. 2 shows the profile of the morphology index M as a function of diameter for two types of polysilicon.

EXAMPLE 1

FIG. 1 shows an exemplary thermographic image A. It was recorded with an infrared camera through an inspection window from a silicon rod in a Siemens reactor at a height about halfway between the bridge and the electrode. The silicon rod was in close proximity to the inspection window. Recording was carried out after a deposition time of about 90 h. The Siemens reactor was fitted with 24 rod pairs, wherein the filament rods had a length of 2.5 m (length between bridge and electrode). Type C polysilicon was to be deposited. Accordingly, M was to have a value of 1 to 3. The measurement area $A_{max}$ corresponds to the area inside the dashed line.

The images B and C show the result of segmentation of a thermographic image. The software LabVIEW (Fa. National Instruments) and a median filter (30*30 pixel) were used to carry out the segmentation into the area fraction $A_p$ (image B, elevations in white within the dashed line, temperature $T_p$=1027° C.) and the area fraction $A_t$ (image C, trenches in white within the dashed line, temperature $T_t$=1033° C., $A_t$=20 cm²). The measurement area $A_{max}$ was 57 cm². According to formula I at this point in time of the deposition M was 2.1 which is within the target value range for polysilicon type C.

EXAMPLE 2

FIG. 2 plots the profile of M against the silicon rod diameter d [mm] for two different deposition processes, i.e. two different polysilicon qualities. The upper curve relates to the production of type D. The lower curve relates to the production of type C. Type C is more compact than type D and is used for more sensitive applications. Type C should have a value for M of 1 to 3 while type D should have a value of from 3 to 5. Both processes were performed in the same Siemens reactor but with different settings for at least one parameter from the group comprising U, I, $T_{OF}$, reaction gas composition and volume flow rate. Determination of M was carried out continuously during the entire deposition time. The rod diameter was determined on two rods with a digital camera and image processing.

Both processes begin with compactly deposited polysilicon having values for M close to 0 which is especially due to the filament rods made of very compact silicon. For production of type D a relatively steep profile was selected for M already shortly after commencement of the deposition. The target level of M of about 3.5 was already to be achieved at a rod diameter of about 90 mm. The steep profile toward a rather porous polysilicon was achieved especially by altering the surface temperature, gas composition and/or volume flow. M was subsequently adjusted to a value between 3.5 and 3.9 (average of about 3.7).

For production of type C too the target value of about 1.5 was to be achieved at about 90 mm. Control of the above-described parameters was adapted accordingly. For the remaining deposition time M was kept constant at an average of 1.6.

It it is apparent from the example how conveniently the deposition may be controlled for production of a very wide variety of polysilicon types using the index M.

The invention claimed is:

1. A method for producing polycrystalline silicon comprising introducing a reaction gas, which in addition to hydrogen contains silane and/or at least one halosilane, into a reaction space of a gas phase deposition reactor, wherein the reaction space comprises at least one heated filament rod upon which by deposition silicon is deposited to form a polycrystalline silicon rod, wherein during the deposition, to determine the morphology of the silicon rod,
    at least one thermographic image of the surface of said rod comprising a measurement area $A_{max}$ is generated,
    by image processing a segmentation of the measurement area $A_{max}$ into a first and a second area fraction is performed, wherein the first area fraction $A_t$ corresponds to a relatively high temperature $T_t$ compared to local average temperature values and the second area fraction $A_p$ corresponds to a relatively low temperature $T_p$ compared to local average temperature values, and a morphology index M is determined according to $$M = (T_t - T_p) * \frac{(A_t + A_p)}{A_{max}} * \frac{A_t}{(A_t + A_p)}, \quad \text{(formula I)}$$

wherein through variation of at least one parameter selected from the group comprising U, I, surface temperature $T_{OF}$, reaction gas composition and volume flow the deposition is controlled such that for the production of polysilicon type B M has a value of 0.1 to 1, polysilicon type C M has a value of 1 to 3, or polysilicon type D M has a value of 3 to 5, wherein U is in a range from 50 to 500 V, I is in a range from 500 to 4500 A, $T_{OF}$ is in a range from 950° C. to 1200° C., the volume flow is in a range from 1500 to 9000 m³/h and the reaction gas before entry into the reactor contains hydrogen in a proportion of 50% to 90%.

2. The method as claimed in claim 1, wherein the index M is kept constant during the deposition.

3. The method as claimed in claim 1, wherein the determination of the index M is carried out continuously during the entire deposition or discontinuously at various points in time during the deposition.

4. The method as claimed in claim 1, wherein the determination of the index M is carried out discretely in a time interval.

5. The method as claimed in claim 1, wherein at least two thermographic images of the same silicon rod or of different silicon rods are generated to determine M.

6. The method as claimed in claim 1, wherein the segmentation is carried out with a rank filter.

7. The method as claimed in claim 1, wherein the measurement area $A_{max}$ has a size of 10 to 300 cm².

8. The method as claimed in claim 6, wherein the rank filter is a median filter.

9. The method as claimed in claim 7, wherein the measurement area $A_{max}$ has a size of 30 to 200 cm².

10. The method as claimed in claim 9, wherein the measurement area $A_{max}$ has a size of 50 to 150 cm².

* * * * *